Patented June 26, 1951

2,558,547

UNITED STATES PATENT OFFICE 2,558,547

CATALYTIC PROCESSES FOR ESTER-ESTER INTERCHANGE

Eddy W. Eckey, Cincinnati, Ohio

No Drawing. Application January 11, 1949,
Serial No. 70,370

9 Claims. (Cl. 260—468)

This invention relates to catalytic ester-ester interchange, and more particularly to the use of certain compounds for effecting catalysis in such reactions.

It is already known that ester-ester interchange reactions may be catalyzed by the addition of small quantities of alkali metal alkoxides, such as sodium methoxide, and that the addition of such alkoxides to ester systems permits the practice of ester-ester interchange at surprisingly low temperatures, temperatures so low in fact that crystallization of high melting esters in the system may occur while the ester-ester interchange reaction is in progress.

I have observed, however, that the use of alkoxides in catalyzing the ester-ester interchange reaction has the disadvantage of introducing by-product alcohol esters into the product of the reaction when the alkoxide is made from an alcohol different from that of the esters in the reaction. For example, methyl esters are formed by the use of methoxides in an ester-ester interchange involving glycerides. The amount of such by-product esters formed in the reaction is approximately equivalent to the amount of alkoxide added. In edible fat manufacture, for example, it is preferable that such esters be removed, and this may be accomplished in the steam deodorization step. However, recovery of fatty matter thus removed is uneconomical and the by-product ester formation therefore represents a potential loss. I have observed also that in such applications the use of alkali metal alkoxides results in the formation of a small amount of fatty material containing unesterified hydroxyl groups, which amount is substantially equal to the by-product esters formed.

It is an object of the present invention to provide an improved process for catalytic ester-ester interchange which does not suffer the above noted disadvantages of processes employing alkoxides.

In accordance with the present invention, I have discovered that the addition of an alkali metal hydride, such as sodium hydride, to the ester system catalyzes the ester-ester interchange reaction but that neither by-product esters nor materials containing unesterified hydroxyl groups are formed in the reaction. I have discovered also that the effectiveness of the hydride increases with decrease in particle size and that the ester-ester interchange reaction may be advantageously conducted under desired conditions, in a ball mill for example, wherein the particles of the hydride are subjected to size-reducing conditions as the reaction proceeds. Moreover, I have discovered that the suspension formed by grinding and reducing the particle size of the hydride in the presence of an inert volatile liquid such as xylene or hexane is especially useful in catalyzing the ester-ester interchange reaction.

Alkali metal hydrides, like alkali metal alkoxides, are susceptible to decomposition by moisture and acidic substances, including free fatty acids and acidic gases such as carbon dioxide. Consequently, appropriate care and precautions should be exercised during handling and storage of the hydride and during the ester-ester interchange process itself. It is preferable, for example, that the reaction be conducted under an atmosphere of an inert gas, such as nitrogen, or substantially in vacuo.

The amount of alkali metal hydride which should be added to the reaction mixture to effect catalysis is about equivalent to the amount of alkali metal methoxide normally used. Since the equivalent weights of alkali metal hydrides are less than the equivalent weights of corresponding alkali metal methoxides, the amount of hydride used may be less. For example, 0.2 per cent by weight based on the weight of the ester reaction mixture may be employed. Smaller quantities such as 0.03 per cent are effective in promoting the interchange, but I have found that the reaction proceeds at a rather low rate unless at least 0.05 per cent is employed. My preferred range of hydride usage is from about 0.05 per cent to about 0.5 per cent, but larger amounts may be readily employed if desired without the disadvantage of forming by-product alcohol esters of the fatty acids. However, use of amounts substantially in excess of one per cent is not recommended in order that condensation between esters may be held at a minimum.

Alkali metal hydrides may be used as the catalytic material in both those ester-ester interchange reactions conducted wholly in the liquid phase and those conducted at temperatures wherein simultaneous crystallization of higher melting esters is effected. Thus the temperature of the ester-ester interchange reaction wherein the alkali metal hydride is used as the catalytic material may vary from very low temperatures such as 0 or 5° C. to higher temperatures, such as 120° C. Temperatures in excess of 120° C. are not recommended because with alkali metal hydride present such temperatures effect actual condensation of esters in addition to the ester-ester interchange.

The invention may be used in promoting ester-ester interchange between organic esters of all kinds provided the esters are substantially non-acid and substantially free from moisture. An important application is of course in the molecular rearrangement of substantially non-acid, completely esterified esters of glycerol and a mixture of fatty acids, such as vegetable, animal, and marine fats and fatty oils including cottonseed oil, soybean oil, sunflower seed oil, palm oil, coconut oil, tallow, lard, menhaden oil, sardine oil, hydrogenated derivatives of same, mixtures of such glycerides, and the like. However, other applications have been successfully conducted. Thus the invention may be used in effecting ester-ester interchange between aromatic carboxylic acid esters of monohydric alcohols (e. g. dimethyl phthalate) and low or high molecular weight aliphatic carboxylic acid esters of polyhydric alcohols such as glycerol (triacetin, trilinolein). Similarly the reaction between monohydric alcohol esters of aliphatic carboxylic acids (ethyl stearate) and low or high molecular weight fatty acid esters of polyhydric alcohols (glycerol tributyrin, glycerol triolein) may be catalyzed by the addition of the alkali metal hydrides.

In the use of alkali metal hydride, such as sodium hydride for example, hydrogen is evolved more or less rapidly when the compound is added to the mixture of esters which is to be subjected to the interchange reaction. Ordinarily this evolution of hydrogen presents no difficulty, but, of course, appropriate handling must be provided for in the interest of safety.

Aside from the precautions that should be observed because of hydrogen evolution, suitable safety measures should also be taken in the handling of alkali metal hydride, and the principal necessity is the avoidance of contact with water. Sodium hydride is almost as reactive in water as sodium and readily results in fire.

The invention will be more fully understood from the following specific examples, but it is to be understood that the invention is not limited to the conditions shown in these examples but rather by the scope of the appended claims.

*Example 1.—Preparation of sodium hydride suspension in xylene.*—To 240 ml. of dry xylene were added 12 gms. of commercial sodium hydride. The mixture was placed in a stainless steel ball mill containing 100 steel balls of ½ inch diameter. Air in the mill was exhausted and replaced with dry nitrogen. The mill was rotated at about 60 R. P. M., and at the end of 6 hours the suspension was removed from the ball mill, 40 ml. of fresh xylene being used to flush the suspension from the mill. By analysis (titration with hydrochloric acid) the resulting suspension contained 0.046 gm. of sodium hydride per ml.

Dilute suspensions such as those prepared above tend to settle, leaving clear solvent at the surface. However, more concentrated suspensions are much more stable and I have found, for example, that a suspension of sodium hydride in hexane analyzing as 0.28 gm. of sodium hydride per ml. is stable to a much greater degree than the product of Example 1. Higher concentrations are of course permissible. In all cases the suspension flows easily, even when the weight of the hydride is about one-third of the total weight of the suspension.

Other liquids inert to the hydride such as heptane, hexane, kerosene, petroleum ether, benzene, toluene, diethyl ether, and the like, may be substituted for the xylene in the above example without departing from the spirit of the invention. It is preferable, however, to use substances which are normally liquid and readily volatilizable and which may be easily separated from the reaction mixture as by distillation without changing the degree of ester interchange effected.

*Example 2.—Reaction of dimethyl phthalate with triacetin.*—To 47.6 parts by weight of dimethyl phthalate were added 35.6 parts by weight of triacetin. The mixture was added to a closed vessel provided with an agitator and means for maintaining an atmosphere of inert gas in the vessel. The mixture was first heated to about 80° C. under reduced pressure to insure dryness, and then was cooled to room temperature under vacuum. The vacuum was broken by the admission of hydrogen, and .425 part by weight of sodium hydride were added as a suspension in xylene as prepared in accordance with Example 1. The container was closed to the atmosphere and the pressure was reduced to about 140 mm. of mercury. The temperature of the reaction mixture was raised to about 52° C. in about 5 minutes. Distillate began to appear almost immediately in an ice chilled trap leading to the aspirator. Within 10 minutes the mix had become noticeably more viscous and distillation was rapid. After about 27 minutes total reaction time, and after the temperature had risen to a maximum of 90° C., the vacuum was broken with hydrogen; then glacial acetic acid was added to neutralize and inactivate the catalyst. The reaction was thus stopped before a hard resin had been formed. The product was a yellowish, taffy-like resin. The distillate in the trap had a strong odor of methyl acetate.

*Example 3.—Reaction of methyl esters of fatty acids from winterized cottonseed oil with triacetin.*—200 parts by weight of methyl esters of fatty acids from winterized cottonseed oil were charged to a reaction vessel similar to that used in Example 2. The esters were heated under vacuum to effect drying and then cooled to 40° C. A suspension of catalyst in xylene such as that prepared in Example 1 was added in quantity sufficient to give 0.8 parts by weight of sodium hydride. Since the acid value of the methyl esters employed was 5.0, it was calculated that about .43 part by weight of the sodium hydride would be inactivated, thereby leaving .37 part by weight to act as a catalyst. The mixture thus formed was heated during stirring under full vacuum of the aspirator to 60° C. Then, 20 minutes after the catalyst had been added, 50 parts by weight of triacetin were added to small portions over a period of about 20 minutes. The temperature during the addition of the triacetin was maintained from 53 to 63° C. After the triacetin had been added, the temperature was gradually raised to a maximum of 96° C. Methyl acetate distilled over during the raction. After a total reaction time of 133 minutes, the reaction product was dark brown and opaque. The vacuum was broken with hydrogen, and glacial acetic acid was added to inactivate the catalyst. This acidulation lightened the color to about that of the methyl esters originally used. The product was washed once with dilute hydrochloric acid, then 3 times with water and then dried under vacuum to remove moisture and xylene. As will be shown by the figures in the following table, a marked change in the saponification number was effected by the interesterification.

| Sample | Saponification No. |
|---|---|
| Methyl esters of fatty acids from winterized cottonseed oil | 195 |
| Mixture of methyl esters and triacetin before reaction | 1 310 |
| Product of the example (methyl acetate removed) | 204 |

1 Calculated.

Lithium hydride may be substituted for the sodium hydride in the above example.

*Example 4.—Ester-ester interchange with simultaneous crystallization as practiced on winterized cottonseed oil.*—Winterized cottonseed oil, 200 parts by weight, was heated under vacuum to 200° C. to effect drying. After the oil had been cooled to approximately room temperature it was mixed with 0.2% sodium hydride added as a suspension in heptane. The mixture was stirred under vacuum for 30 minutes at a temperature of 50° C.±3° C. The vacuum was then broken with nitrogen and the flask containing the mixture was placed in a bath of ice water where it was held for 30 minutes. Just before the end of this chilling period, the mixture thickened considerably so that it could not be agitated easily in the flask. The flask and contents were then placed in a water bath held at 20° C. During the next half hour the mixture became firmer. The mixture was held in the water bath at 20 to 21° C. for 5 hours, then left overnight in the same bath without control. Nineteen hours later the water temperature was 15° C., and 8 hours later, after a total reaction time of 32 hours, the water temperature was 17° C. At this point the reaction was stopped by inactivation of the catalyst with an amount of glacial acetic acid sufficient to neutralize the catalyst. After the acid was stirred in, the color changed from tan to white, and the consistency was about that of ordinary plastic shortening. The melted product was washed with dilute hydrochloric acid, then with water, and finally dried by heating under reduced pressure with a current of carbon dioxide passing through the product.

It will be noted from the data in the following table that a marked change in the characteristics of the oil was effected by ester-ester interchange with simultaneous crystallization.

| Characteristic | Original Oil | Product of This Example |
|---|---|---|
| Melting point | About 0° C. | 48° C. |
| Cloud Point | −8° C. | 29.5° C. |
| General characteristic at room temperature | Oil | Semi-solid, shortening-like. |

*Example 5.—Ester-ester interchange of technical tristearin and winterized cottonseed oil.*—A mixture of 88 parts winterized cottonseed oil and 12 parts of hydrogenated soybean oil having an iodine value of 4.9 was dried at about 120° C. under vacuum as in Example 4. The mixture was then cooled to 55° C. and 0.2% of sodium hydride was added as a suspension in xylene. At 5, 15 and 60 minutes after the addition of the catalyst, with the temperature held at 55° C., samples were withdrawn and immediately acidulated with acetic acid to inactivate the catalyst and stop the reaction. At the end of the first hour another portion of catalyst equal to 0.2% sodium hydride was added and samples were again taken at 5, 15 and 60 minutes after the latter addition. The samples and the final product were washed with dilute hydrochloric acid and with water, and were heated under vacuum to remove moisture and xylene.

The following data will show that 0.2% sodium hydride was sufficient to bring the reaction to substantial equilibrium in one hour at 55° C., over 90% of the change taking place in the first 15 minutes.

| First addition of catalyst (0.2% NaH) | | Second addition of catalyst (Total of 0.4% NaH) | |
|---|---|---|---|
| Time | Capillary M. P., °C. | Time | Capillary M. P., °C. |
| 0 (original mix) | 57.8 | 0 (end of 1st hr.) | 39.8 |
| 5 min | 54.0 | 5 min | 39.4 |
| 15 min | 41.0 | 15 min | 39.5 |
| 60 min | 39.8 | 60 min | 39.4 |

Although it is preferable to use a suspension of the hydride in xylene or other hydrocarbon as in the above example, the desired amount of hydride may be ground with or otherwise suspended in one of the reactants, such as the winterized cottonseed oil, which suspension may then be added to the other reactant when it is desired to effect the interchange.

*Example 6.—Reaction of winterized cottonseed oil and technical tristearin catalyzed by sodium hydride ground directly in the ester mixture.*—440 grams of winterized cottonseed oil and 60 grams of hydrogenated soybean oil having an iodine value of 8.5 were mixed and heated to 200° C. under vacuum. The mixture was then cooled and poured into a ball mill containing 100 ½-inch balls, 100 ⅜-inch balls and 50 ¾-inch balls. To the mixture was added 0.947 gram (0.2%) of commercially available sodium hydride. The ball mill was then closed and the air in the mill was withdrawn by an aspirator and replaced with dry nitrogen. The mill was then rotated at about 70 R. P. M. and heated by means of infra red lamp to reaction temperature. Samples were taken at intervals, each being acidulated immediately with phosphoric acid in order to inactivate the catalyst. The acidulated product was then dissolved in ether, washed four times with water and heated under vacuum to remove the ether. After 3.8 hours grinding, heating of the mill was discontinued. The mill and contents were allowed to stand overnight at room temperature. The catalyst in the fat mixture was then inactivated.

It will be noted from the following data that rapid and complete dispersion of the catalyst was effected and ester-ester interchange to random distribution followed by directed interchange at lower temperature was obtained.

| Time, hrs. | Temperature, °C. | | Capillary M. P., °C. | Remarks |
|---|---|---|---|---|
| | At indicated time | During interval | | |
| 0 | 30 | | 57.2 | |
| 1.0 | 57 | 30–58 | 57.4 | Granules of NaH visible. |
| 2.0 | 58 | 57–58 | 56.2 | A few granules visible. |
| 3.0 | 53 | 58–53 | 35.6 | Greenish color before acidulation. Acid caused frothing. |
| 3.8 | 48 | 53–48 | 34.8 | Brown before acidulation. Frothed. |
| 19.5 | 20 | 48–20 | 49.0 | Much harder than original fat. |

Sodium hydride is readily available in commercial quantities and preference therefor may be indicated. However, lithium hydride in 0.5 per cent concentration has shown activity in catalyzing interesterification reactions and other less common alkali metal hydrides, such as potassium, rubidium, and cesium hydrides, may be employed if desired.

In the practice of the present invention the elimination of by-product esters makes more practical the use of liberal proportions of catalytic material which may be desirable in ester-ester interchange reactions conducted at very low temperatures.

Similarly, in the practice of such interchange reactions wherein a fraction of the reaction product is recycled and reacted with a portion of fresh ester mixture, the addition of alkali metal hydride in accordance with the present invention has proved to be advantageous since there is no accumulation of by-product esters as may be obtained in the use of alkali metal alkoxide.

Having thus described my invention, what I claim and desire to secure by Letters Patent is:

1. In the process of catalytically effecting ester-ester interchange between organic esters under non-acid conditions, the step of contacting said esters in substantially dry condition at a temperature not substantially exceeding 120° C. in the presence of from 0.03 per cent to not substantially more than one per cent by weight of finely divided and suspended alkali metal hydride, the said amount of hydride and said temperature being sufficient to promote ester-ester interchange without substantial condensation of said esters.

2. The process of claim 1 in which the alkali metal hydride is sodium hydride.

3. In the process of effecting ester-ester interchange between organic esters under non-acid conditions, the steps of adding from 0.03 per cent to not substantially more than one per cent by weight of finely divided alkali metal hydride to a substantially dry mixture of said esters and maintaining said hydride in suspension in said mixture of esters under an atmosphere of inert gas at a temperature not substantially exceeding 120° C., the said amount of hydride and said temperature being sufficient to promote ester-ester interchange without substantial condensation of said esters.

4. The process of claim 3 in which the alkali metal hydride is added in the form of a suspension in a dry liquid medium inert to the esters and to the hydride.

5. The process of claim 4 in which the liquid medium is an inert hydrocarbon which is more volatile than the esters.

6. In a process of effecting ester-ester interchange in a mixture of organic esters under non-acid conditions, the steps of bringing finely divided alkali metal hydride into contact with an ester of said mixture in an atmosphere of inert gas and in the substantial absence of moisture and mixing the contacted materials with another of said esters and permitting ester-ester interchange to take place under an atmosphere of inert gas, the amount of hydride being from about 0.03 per cent to not substantially more than one per cent by weight and the temperature of said mixing being not substantially greater than 120° C., said amount of hydride and said temperature being sufficient to promote ester-ester interchange without substantial condensation of said esters.

7. In a process of effecting ester-ester interchange between organic esters under non-acid conditions, the steps of establishing a substantially dry system comprising at least two of said esters, adding from 0.03 per cent to not substantially more than one per cent by weight of alkali metal hydride to the system and grinding the alkali metal hydride to smaller particle size in the presence of said esters at a temperature not substantially exceeding 120° C., the said amount of hydride and said temperature being sufficient to promote ester-ester interchange without substantial condensation of said esters.

8. In a process of effecting ester-ester interchange in a mixture of organic esters under non-acid conditions, the steps of adding alkali metal hydride to an ester of said mixture in substantially dry form, grinding the alkali metal hydride with the ester to reduce the particle size of the hydride, mixing the ground mixture with another ester, and permitting ester-ester interchange to take place in an atmosphere of inert gas at a temperature not substantially exceeding 120° C., the amount of alkali metal hydride based on the total weight of esters being from about 0.03 per cent to not substantially more than one per cent by weight, said amount and said temperature being sufficient to promote ester-ester interchange without substantial condensation of said esters.

9. In the process of effecting ester-ester interchange between organic esters under non-acid conditions, the step of contacting said esters in substantially dry condition in an atmosphere of nitrogen at a temperature not substantially exceeding 120° C. in the presence of from about 0.05 per cent to about 0.5 per cent of finely divided and suspended sodium hydride, the said amount of hydride and said temperature being sufficient to promote ester-ester interchange without substantial condensation of said esters.

EDDY W. ECKEY.

REFERENCES CITED

The following references are of record in the file of this patent:

UNITED STATES PATENTS

| Number | Name | Date |
| --- | --- | --- |
| 2,158,071 | Hansley | May 16, 1939 |
| 2,211,419 | Hansley | Aug. 13, 1940 |
| 2,378,007 | Eckey | June 12, 1945 |
| 2,442,533 | Eckey | June 1, 1948 |